Nov. 4, 1958  J. H. KRAEMER  2,858,597
METHODS AND APPARATUS FOR MANUFACTURING ORNAMENTAL ARTICLES
Filed Nov. 14, 1952  3 Sheets-Sheet 1

Inventor
Julius H. Kraemer
by Dike, Thompson & Sanborn
Att'ys.

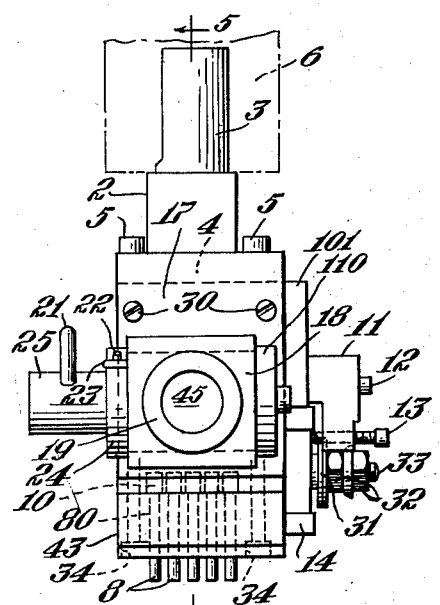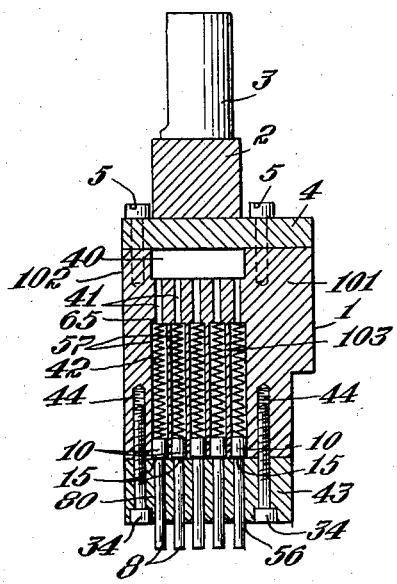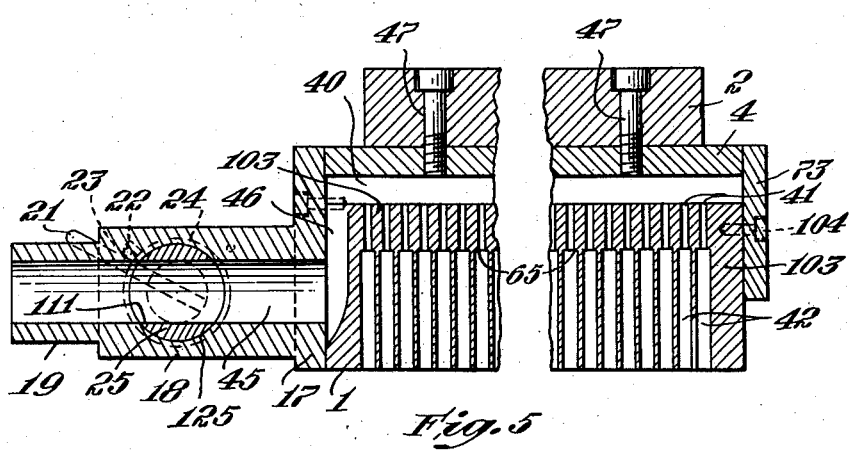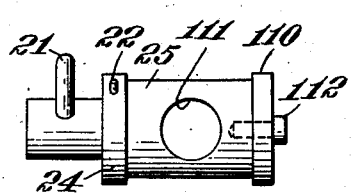

Nov. 4, 1958  J. H. KRAEMER  2,858,597
METHODS AND APPARATUS FOR MANUFACTURING ORNAMENTAL ARTICLES
Filed Nov. 14, 1952  3 Sheets-Sheet 3
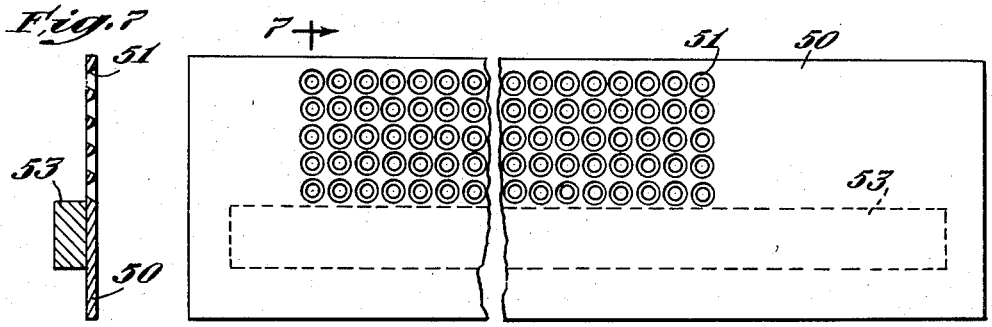
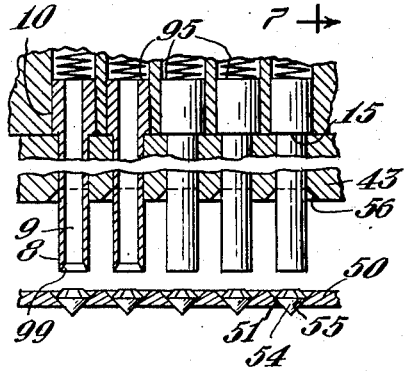
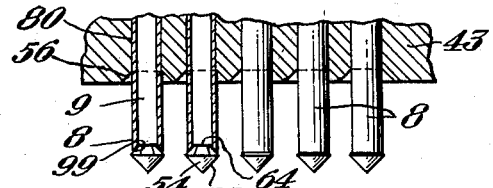
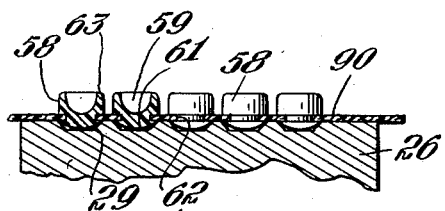
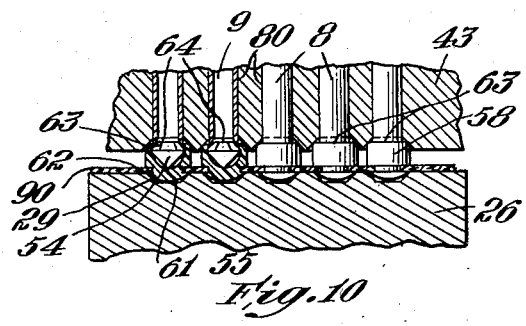
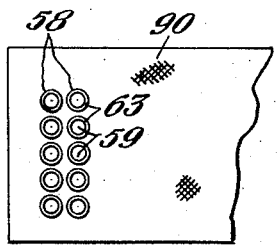
Inventor
Julius H. Kraemer
by Dike, Thompson & Sanborn
Att'ys.

United States Patent Office 2,858,597
Patented Nov. 4, 1958

2,858,597

METHODS AND APPARATUS FOR MANUFACTURING ORNAMENTAL ARTICLES

Julius H. Kraemer, Pawtucket, R. I., assignor, by mesne assignments, to Dyer Corporation, Providence, R. I., a corporation of Rhode Island Application November 14, 1952, Serial No. 320,586

22 Claims. (Cl. 29—10)

The present invention relates to ornamental articles. More particularly, it relates to improved processes and apparatus for setting and locking small ornamental objects into prepared receptacle cavities made of materials such as plastic or metal to produce ornamental articles.

An example of a completed ornamental article to which the present invention relates is a necklace or a bracelet or a handbag containing a series of cavities arranged in a predetermined pattern into which small ornamental objects such as imitation decorative stones or imitation pearls have been placed and are retained. In the case of metal receptacles, the small ornamental objects are usually held in place by having prongs rolled down over the stones; in the case of plastic receptacles, the top part of the wall surrounding the cavities is rolled down over the stones. Stones are also retained in receptacle cavities by glue or paste.

In the past, these small ornamental objects have been set in receptacle cavities in the following manner:

(1) The manual placing of each individual stone in the cavity for which it is intended, and the crimping or folding over of the prongs or the plastic side walls by the use of an appropriate tool set into a press.

(2) The individual stone is placed manually in a holder which has been placed in a fixed position in the bed of a press, the holder being designed to accept and hold the stone in position. The cavity in the metal or plastic receptable is held upside down by the operator directly over the individual stone in the holder and then the press is actuated so as to force the stone into the cavity and crimp the prongs or surrounding walls of the receptacle.

Since many ornamental articles have very intricate ornamental object designs or patterns which necessitate the setting of a great many individual stones, it is obvious that the use of the above known methods of stone setting wherein each stone must be individually set are very time consuming and laborious and hence very costly.

The present invention provides a new and improved apparatus and/or method for simultaneously depositing a plurality of small ornamental objects into a plurality of ornamental object receptacles, arranged in a predetermined pattern or design, without the necessity of manually handling each individual ornamental object separately.

The present invention also provides a new and improved apparatus and/or method for simultaneously aligning a plurality of small ornamental objects in a predetermined pattern or design and in a position for being subsequently simultaneously deposited in a plurality of receptacles for said ornamental objects arranged in the same predetermined pattern or design without the necessity of manually handling each individual ornamental object separately.

The present invention also provides a new and improved method and/or apparatus for simultaneously depositing a plurality of small ornamental objects in a plurality of receptacles for said ornamental objects arranged in a predetermined pattern or design and subsequently simultaneously crimping said plurality of objects deposited in said plurality of receptacles in one operation without the necessity of manually handling each individual object.

In the accompanying drawings Fig. 1 is a front elevation of a particular embodiment of the apparatus of the present invention with a cut-away portion.

Fig. 3 is an end view of the ornamental object-holding tool of Fig. 1 taken along the line 3—3 of Fig. 1.

Fig. 4 is a section taken along the line 4—4 of Fig. 1.

Fig. 5 is a broken section taken along line 5—5 of Fig. 3, with certain elements removed.

Fig. 6 is a top plan view of a particular embodiment of the loading or aligning bar of the present invention.

Fig. 7 is a section taken along the line 7—7 of Fig. 6.

Fig. 8 is a section taken along the same line as Fig. 4 at one stage of operation of the apparatus of the present invention.

Fig. 9 is a section taken along the same line as Fig. 4 at a later stage of operation of the apparatus of the present invention.

Fig. 10 is a section taken along the same line as Fig. 4, during a still later stage of operation of the apparatus of the present invention.

Fig. 11 discloses a top plan view of one type of ornamental article to which the present invention applies.

Figure 1:
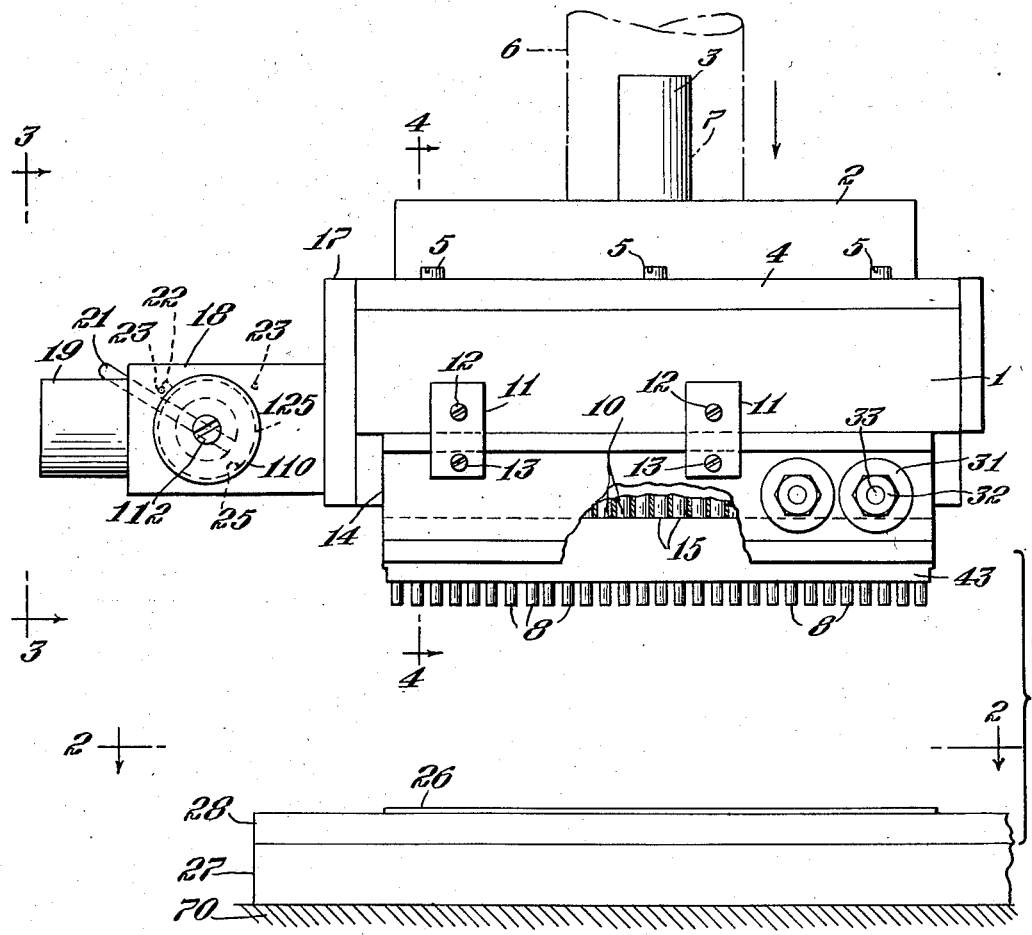
Figure 2:
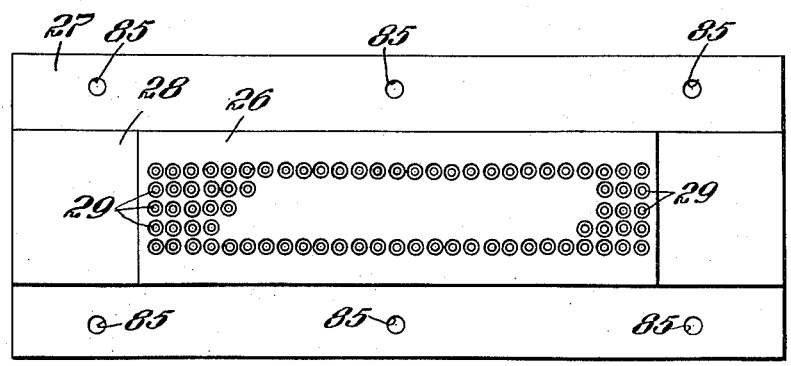
Fig. 2 is a top plan view of the receptacle-holding plate of Fig. 1 taken along the line 2—2 of Fig. 1.

Fig. 12 discloses a front plan view of the valve shaft 25 of Fig. 1.

Referring to the above figures, 1 represents a chamber housing of an ornamental object-holding tool having two side walls 101 and 102, and one bottom wall 103 (Fig. 4), defining open channel-like chamber spaces 40 and 46 (Figs. 4 and 5), the bottom wall 103 having a plurality of passages therethrough made up of a wide portion 42 and a narrow portion 41 (Figs. 4 and 5). Metal top plate 4 attached to the top of side walls 101 and 102 by six inset screws 5 forms a top wall for chamber spaces 40 and 46 and plate 73 (Fig. 5) attached to the ends of walls 101 and 102 and top plate 2 by means of four screws 104 forms one wall for spaces 40 and 46. The ornamental object holding tool is mounted in a retaining socket 7 of ram 6 of a press by means of solid metal shaft 3 which extends into and is integral with metal support bar 2, which, in turn, is attached to top plate 4 by two screws 47 (Fig. 5). Flange member 17, attached to side walls 101 and 102 and bottom wall 103 by means of inset screws 30 (Fig. 3), forms the other end wall for open spaces 40 and 46. Flange member 17 extends into and is integral with a valve housing 18 having a square shaped perimeter, which in turn extends into and is integral with a cylindrical hose connecting section 19 adapted to having a rubber hose (not shown) attached therearound which rubber hose is in turn connected to a source of vacuum (not shown). Passage 45 passes through cylindrical section 19, valve housing 18 and flange member 17 to connect open spaces 46 and 40 with the rubber hose and finally the source of vacuum.

Passage 45 has a valve shaft 25 (Figs. 1, 3 and 12) running transversely thereacross. Valve shaft 25 is rotatably supported in bore 125 (Fig. 5) of valve housing 18 and has a passage 111 passing transversely therethrough, which, when aligned with passage-way 45 by rotation of the valve shaft in bore 125 about its longitudinal axis connects open spaces 40 and 46 with the source of vacuum. However, when the valve shaft passage 111 is positioned perpendicular to passage 45 by rotation of the valve shaft in bore 125, the valve shaft completely blocks passageway 45.

Longitudinal movement of valve shaft 25 in bore 125 is prevented by enlarged disc 110, which is attached to shaft 25 by means of screw 112, and enlarged disc 24 which is integral with shaft 25. Stop member 22 is rigidly attached to the periphery of enlarged disc 24 with which it is adapted to be rotated upon rotation of the valve shaft 25 by means of handle 21. Two stops 23 attached to valve housing 18 cooperate with stop member 22 to limit the rotation of the valve shaft when fully open and fully closed positions of valve shaft 25 have been reached.

In each of the wide portions 42 of the passageways in the bottom wall 103 of the housing 1 of the ornamental object-holding tool, there is a hollow pin (Fig. 8) having a large outside diameter section 10, with an outside diameter slightly smaller than the inside diameter of large portion 42 of the passageway, and a small outside diameter section 8. Passage 9 passes completely through both sections 8 and 10 of each pin. At the juncture of sections 8 and 10 where the outside diameter of the pin is increased from small to large there is formed a shoulder 15.

A crimping plate 43 is attached to the bottom surface of the chamber housing 1 by four inset screws 34 (Figs. 3 and 4) screwed into threaded bores 44. Crimping plate 43 has a plurality of passageways 80 passing therethrough, one for each passageway 41 and 42 in chamber housing 1. Passageways 80 of crimping plate 43 are axially aligned with passageways 41 and 42 of chamber housing 1 and have a diameter slightly larger than the outside diameter of section 8 of the hollow pins.

Springs 57 (Figs. 4 and 8), compressed between shoulders 65 formed at the point where small portions 41 of the passageways in bottom wall 103 of chamber housing 1 extend into large portion 42 and shoulders 95 (Figs. 4 and 8) formed by the ends of the walls of large outside diameter sections 10 of the hollow pins, bias the hollow pins downwardly to the point where shoulders 15 of the hollow pins strike the top surface of crimping plate 43, at which position the ends of the hollow pins protrude from the bottom surface of the crimping bar as shown in Figs. 1, 3, 4, 8 and 9.

The inside surfaces of the protruding ends of the hollow pins have flared out portions 99 (Figs. 8, 9 and 10) in which the top sections 64 of ornamental objects 54 are adapted to fit.

On the bottom surface of crimping plate 43, surrounding each passageway 80 as it emerges through the bottom of the crimping plate is a crimping surface or cavity 56 (Figs. 4, 8, 9 and 10).

Attached to the base 70 of the press (Figs. 1, 2, 8 and 10) is a metal receptacle holding plate comprising a base section 27 which is bolted to the base 70 of the press by bolts 85. Integral with base section 27 is a receptacle holding section 28 with a raised portion 26 having the same number of sloped wall cavities 29 in the top surface thereof as there are passages 41 and 42 and hollow pins 8 and 10 in the bottom wall 103 of chamber housing 1 of the object-holding tool, such cavities being arranged in the same pattern as such passageways and hollow pins so that when such pins are moved vertically downward by operation of the ram of the press, their center lines align themselves vertically with the axes of the cavities.

Bottom portions 61 (Figs. 8, 10 and 11) of a plurality of receptacles 58 having receptacle cavities 59 crimped onto a web of cloth 90 by means of indentations 62 to form the same pattern as cavities 29 fit simultaneously within cavities 29 (Figs. 8 and 10). Top portions 63 of such receptacles are adapted to be crimped over the top portions 64 (Fig. 10) of small ornamental objects 54 when crimping surfaces 56 of crimping plate 43 are brought down thereupon after the receptacles 58 are deposited in cavities 29 and objects 54 are deposited in cavities 59 of receptacles 58.

Object loading or aligning metal plate 50 (Figs. 6 and 7) has a guide bar 53 attached to the bottom surface thereof and a plurality of cavities 51 having sloped walls arranged in the same pattern as hollow pins 8 and 10 and cavities 29 of receptacle holding plate 26. The slope and shape of walls 51 of the object loading plate 50 correspond to the slope and shape of edges 55 of ornamental objects 54, so that when a quantity of ornamental objects are deposited on the top of plate 50 and the plate is vibrated or jiggled by hand, surfaces 55 of the objects tend to align themselves with surfaces 51 of the loading plate so that the objects fall into the cavities in the position shown in Fig. 8 which is substantially the same position in which they are eventually deposited in the cavities 59 of receptacles 58, as shown in Fig. 10.

In operating the apparatus of the accompanying drawings the chamber and valve housing of the object-holding tool, with crimping plate 43 and the hollow spring biased pins attached thereto, is mounted on ram 6 of a press as shown in Fig. 1. The receptacle holding plate described above is also mounted on the base 70 of the press as shown in Fig. 1.

A rubber hose (not shown) is then attached to cylindrical section 19 of the valve shaft housing 18 and a vacuum is applied by means of a vacuum pump (not shown) through such hose, passage 45, spaces 46 and 40 and passages of hollow pins 8 and 10 to the flared portions 99 of the protruding ends of such hollow pins.

A plurality of receptacles 58 held in a strip of cloth 90 in the same pattern as the hollow pins and the cavities 29 of the receptacle holding plate 26 are set in cavities 29. The bottom portions 61 of receptacles 58 fit snugly into cavities 29 so that the plurality of receptacles are held firmly in place as shown in Fig. 8.

The loading plate of Figs. 6 and 7 is then gripped by the operator and is inserted with the top surface up, in a trough containing large quantities of ornamental objects 54. While still inserted in the trough of objects with its top surface up, the loading plate is jiggled in such a manner that the top surface thereof is kept up at all times to cause the objects to deposit themselves in the cavities in the loading plate in the particular position shown in Fig. 8. The loaded loading plate 50 is then removed from the trough. Occasionally a few of the objects 54 are wrong side up and in such event they are turned over manually.

The loading plate is then brought toward the surfaces 99 of the protruding ends of the smaller sections 8 of the hollow pins in such a manner that the top surfaces 64 of the objects 54 held in the loading plate are vertically aligned with sections 99 of the hollow pins as shown in Fig. 8. The loading plate is then brought up vertically until the tops 64 of objects 54 come into contact with flared out sections 99 of the hollow pins, whereby such objects are retained on the flared sections 99 of the protruding ends of the hollow pins as shown in Fig. 9 by means of the vacuum applied to such protruding ends through passages 9, spaces 40 and 46 and passage 45. The loading plate 50 is then removed and the ram of the press with the hollow pins having the objects held at the ends thereof as in Fig. 9, is brought vertically downwardly until the ornamental objects are seated in cavities 59 of the receptacles 58 as shown in Fig. 10. The downward movement of the ram is continued, whereby the hollow pins are forced to slide upwardly (section 10 in the passageway 42 of chamber housing 1 and section 8 in passageway 80 of crimping plate 43) against the force of springs 57, until crimping surfaces 56 descend upon sections 63 of the receptacles forcing the same to bend downwardly, whereby the objects are crimped in the receptacles as in Fig. 10. At this point the hollow pins are retracted within passageways 80 and 42 against the pressure of springs 57. The vacuum is then released and the ram is brought vertically upwardly to its starting position. The receptacles with the objects crimped therein are then removed and replaced with other empty receptacles as shown in Fig. 8. The vacuum is then again applied and the above steps are repeated.

If the receptacles are made of a thermo plastic material and it is desired to heat the same to permit them to be rendered soft for crimping, heating plate 14 can be attached to side wall 101 by means of clamp 11, screw 12 and tightening screw 13 as shown in Fig. 1. Heating plate 14 has a terminal 33 for connecting electric wiring thereto, two nuts, 32, serving to hold the wiring on terminal 32 and spacer 31 serving to prevent one of the nuts 32 from contacting the heating plate. By applying electrical current to heating plate 14 to heat the same, the crimping plate is heated so that when it contacts the receptacle portion 63, such portion is softened for crimping.

Any type of standard press can be used in the present invention operated by foot, air or other power.

Although in the above described operation of the apparatus of the present invention the objects are deposited and crimped in the receptacles in one stroke of the press, two strokes may be used, one for depositing the objects and one for crimping them in the receptacle.

Furthermore, although in the modification of the apparatus and process described the spring pins operate through the center of the crimping surfaces of the crimping bar to permit deposit of the objects in the receptacles and crimping them in one operation, the crimping surface may be completely independent of the spring pins. That is, the objects can be picked up and deposited in the receptacles by the hollow pins in one stroke of the press and independently crimped in place by another stroke or in another press by bringing a crimping plate down upon the deposited objects independent of the pins.

In such cases, when spring biased pins are utilized, since the crimping plate is not attached to the bottom of the chamber housing and hence cannot act as a limit stop against which the springs bias the hollow pins downwardly, the apparatus must be modified to provide such a limit stop against which the springs can bias the hollow pins. However, in such cases, the pins may be rigidly attached in the passages within the chamber housing, or pins may be dispensed with completely, the passages in the chamber housing serving to hold the objects by means of vacuum applied thereto.

When two strokes of the same press are utilized, the first stroke of the ram deposits the stones in the cavities as described and the vacuum is then turned off. The ram is subsequently raised, the receptacle holder plate pushed to another prefixed position on the bed beneath another portion of the ram having the crimping bar attached thereto and the ram is given another downward stroke so that the crimping bar may perform its operation.

Although vertical movement of the ram toward the press base has been described, the press base can be moved toward the ram. That is, the receptacle holding bar can be moved toward the pins holding the object rather than vice versa as above described.

Although the use of vacuum applied to the ends of hollow pins has been described above and is preferred, any means for simultaneously and releasably holding a plurality of objects in the desired predetermined design or pattern may be used so long as the objects are held in substantially the same position which they are to be deposited in the receptacle and so long as such means and the means for holding the receptacle are adapted to be moved toward each other in such a manner that the objects in the object holding means and the receptacles in the receptacle holding means are in axial alignment when the objects in the object holding means contact the receptacles in the receptacle holding means.

For instance, the loading plate itself may be utilized as an object holding means by being provided with crimping surfaces as a part of the cavities thereof, the shape of the walls of the cavities being such as to cooperate with the shape of the objects so that the objects are deposited upside down with relation to the position in which they are finally to be set in the receptacles when the loading plate is jiggled or vibrated while inserted in the trough of objects.

In such a case, after the objects are aligned in the cavities of the loading plate as described above, the loaded plate is attached to the base of a press. The cavities are held upside down on a holding plate attached to the ram of the press in the same pattern as the cavities of the loading plate and are brought down on the objects in the loading plate by a stroke of the ram, whereby the objects are deposited in the cavities and the surrounding walls of the receptacles are forced against the crimping surface of the loading plate to crimp the same.

In such case, if desired, when the plurality of receptacles are attached to each other as by a web of material in the predetermined pattern, the receptacles may be placed upside down over the plurality of objects held in the cavities of the loading plate on the base of the press in a predetermined pattern and the ram is then brought down to force the objects into the receptacle cavities and crimp the same therein.

Furthermore, in those cases where the objects are deposited and crimped in the receptacles in one operation instead of hollow pins with a vacuum, vertical protrusions may be utilized in the object-holding tool with adhesive material attached to the ends thereof, which when contacted with the objects, cause them to stick lightly together. After the objects are deposited in the receptacles and the deposited objects are crimped in the receptacles during the same stroke of the press, the protrusions may be easily pulled away from the stones. In such case, the receptacle holders must be so designed that the receptacles and objects crimped therein will not be pulled away with the protrusions.

The plurality of receptacles may be held by the receptacle holding plate by any means other than by the use of cavities as described above so long as they are held firmly in the predetermined design or pattern and so long as they are vertically aligned with the hollow pins of the object holding tool when such pins are brought down by movement of the ram.

Usually the receptacles are attached to a web of material such as cloth, etc., in the predetermined design or pattern as shown in the accompanying drawings. However, in many cases the receptacles are moulded in the desired pattern. The present invention is applicable to receptacles held together in any manner.

It should be understood that the present disclosure is for the purpose of illustration only and that this invention includes all modifications and equivalents which fall within the scope of the appended claims.

I claim:

1. Apparatus for semi-automatically and simultaneously depositing a plurality of small ornamental objects in a plurality of receptacles arranged in a predetermined design without the necessity of handling each individual ornamental object separately, comprising means for simultaneously and releasably picking up and holding a plurality of said objects in a predetermined pattern or design and each of said objects in a predetermined position without handling each individual object separately, means for simultaneously holding a plurality of receptacles for said objects in the same predetermined pattern of design, means for moving said objects, while being held by said pick-up and holding means, and said receptacles, while being held by said receptacle holding means toward each other to cause said plurality of objects held in said predetermined design by said ornamental object pick-up and holding means to be simultaneously deposited in said plurality of receptacles held by said receptacle holding means and means for releasing said objects from said ornamental object pick-up and holding means.

2. The apparatus of claim 1 having a crimping means for simultaneously crimping said plurality of objects in said plurality of receptacles after said plurality of objects are deposited in said plurality of receptacles.

3. The apparatus of claim 1 wherein said object pick-up and holding means comprises a tool adapted to be held in the ram of a press, said tool comprising a chamber and a plurality of passages arranged in said predetermined pattern or design passing through one wall of said chamber connecting said chamber with the atmosphere.

4. An apparatus for semi-automatically and simultaneously depositing a plurality of small ornamental objects in a plurality of receptacles arranged in a predetermined design without the necessity of handling each individual ornamental object separately, comprising means for simultaneously and releasably picking up and holding a plurality of objects in a predetermined pattern or design and each of said objects in a predetermined position without handling each individual object separately, means for simultaneously holding a plurality of receptacles for said objects in the same predetermined pattern or design, means for moving said objects, while being held by said object pick up and holding means, and said receptacles, while being held by said receptacle holding means, toward each other to cause said plurality of objects held in said predetermined design by said ornamental object pick-up and holding means to be simultaneously deposited in said plurality of said receptacles held by said receptacle holding means and means for releasing said objects from said ornamental object pick-up and holding means, crimping means for simultaneously crimping said plurality of objects in said plurality of receptacles after said plurality of objects are deposited in said plurality of receptacles, said pick-up and holding means comprising a tool adapted to be held in the ram of a press, said tool comprising a chamber and a plurality of passages arranged in said predetermined pattern or design passing through one wall of said chamber connecting said chamber with the atmosphere, each of said passages having a hollow pin slidably positioned therein, said chamber being connected to the atmosphere through said hollow pins.

5. The apparatus of claim 4 wherein each of said hollow pins is adapted to slide longitudinally a limited distance to and fro within its respective passageway, an end portion of said pin protruding from the outer end of said passageway at one of its limits of travel, said hollow pin being normally biased toward said one of its limits of travel so as to normally protrude from said passageway.

6. The apparatus of claim 5 having means for applying and releasing vacuum to and from said chamber of said tool and hence to and from the normally protruding ends of said hollow pins, said object pick-up and holding means also comprising a loading plate having a plurality of cavities therein arranged in the same predetermined pattern and design as said receptacles held by said receptacle holding means and said passageways and hollow pins, the shape of the walls of said loading plate cavities cooperating with the shape of said ornamental objects so that when a quantity of ornamental objects are positioned on top of said loading plate and said plate is subsequently vibrated, said objects will position themselves in said cavities in predetermined spatial positions, said loading plate with said objects positioned in the cavities thereof and said protruding ends of said hollow pins being adapted to be moved toward each other until the ends of said hollow pins contact the objects in the cavities of said loading plate so that when a vacuum is being applied to said chamber and to the protruding ends of said hollow pins, said objects will be held to the protruding ends of said pins by said vacuum and said loading plate can be removed.

7. The apparatus of claim 6 wherein said receptacle holding means comprises a rigid member adapted to be held in the base of said press, said rigid member having a plurality of holding cavities for simultaneously holding a plurality of ornamental object receptacles in the same predetermined pattern or design and in alignment with the respective hollow pins.

8. The apparatus of claim 6 having a crimping plate attached to said pick-up and holding tool adjacent to the outside surface of said wall of said chamber, said crimping plate having on its outer surface a plurality of crimping cavities arranged in the same predetermined pattern or design as said plurality of passageways, each of said crimping cavities having a hole through the center thereof passing through said crimping plate, said crimping plate holes being axially aligned with said passageways in said one wall of said chamber, said hollow pins being positioned in said passageways and their respective crimping plate holes and being adapted to slide a limited distance to and fro longitudinally within said passageways and their respective aligned crimping plate holes, said pins being wholly retracted within said passageways and holes at one of their limits of travel and protruding from the outer surface of said crimping plate at their other limit of travel, said hollow pins being normally biased toward their latter limit of travel so as to normally protrude from said outer surface of said crimping plate.

9. An apparatus for simultaneously picking up and holding a plurality of ornamental objects in a predetermined pattern or design comprising a tool adapted to be held in the ram of a press, said tool comprising a chamber, a plurality of passages arranged in said predetermined pattern or design, passing through one wall of said chamber and connecting said chamber with the atmosphere, each of said passages having a hollow pin slideably positioned therein, an end portion of said hollow pin protruding from the outer end of said passageway, said chamber being connected to the atmosphere through said hollow pins.

10. The apparatus of claim 9 wherein each of said hollow pins is adapted to slide a limited distance to and fro longitudinally within its respective passageway, one of the ends of said pin protruding from the outer end of said passageway at one of its limits of travel, and being normally biased toward said one of its limits of travel so as to normally protrude from the outer end of said passageway.

11. An apparatus for simultaneously picking up and holding a plurality of ornamental objects in a predetermined pattern or design comprising a tool adapted to be held in the ram of a press, said tool comprising a chamber, a plurality of passages arranged in said predetermined pattern or design passing through one wall of said chamber and connecting said chamber with the atmosphere, each of said passages having a hollow pin slidably positioned therein, an end portion of said hollow pin protruding from the outer end of said passageway, said chamber being connected to the atmosphere through said hollow pin, each of said hollow pins further being adapted to slide a limited distance to and fro longitudinally within its respective passageway, one of the ends of said pins protruding from the outer end of said passageway at one of its limits of travel, and being normally biased toward said one of its limits of travel so as to normally protrude from the outer end of said passageway a crimping plate attached to said pick up and holding tool adjacent to the outside surface of said one wall of said chamber, said crimping plate having on its outer surface a plurality of crimping cavities arranged in the same predetermined pattern or design as said plurality of passageways, each of said crimping cavities having a hole through the center thereof passing through said crimping plate, said crimping plate holes being axially aligned with said passageways through said one wall of said chamber, said hollow pins positioned within said passageways being adapted to slide a limited distance to and fro longitudinally within said passageways and their respective axially aligned holes in said crimping plate, said pins being wholly retracted within said passageways and holes at one of their limits of travel, and protruding from the outer surface of said crimping plate at their other limit of travel, said hollow pins being normally biased toward their latter limit of travel, so as to normally protrude from said outer surface of said crimping plate.

12. A process for simultaneously depositing a plurality of small ornamental objects in a plurality of receptacles arranged in a predetermined design or pattern without the necessity of handling each individual ornamental object separately, comprising simultaneously picking up and holding a plurality of said objects in said predetermined pattern or design and each of said objects in a predetermined position without handling each individual object separately, and thereafter simultaneously depositing said objects in predetermined spatial positions in a plurality of receptacles held in said predetermined pattern or design.

13. A process for simultaneously depositing a plurality of small ornamental objects in a plurality of receptacles arranged in a predetermined design or pattern without the necessity of handling each individual ornamental object separately, comprising simultaneously picking up and holding a plurality of said objects in said predetermined pattern or design and each of said objects in a predetermined position without handling each object separately, thereafter simultaneously depositing said objects in predetermined spatial positions in a plurality of receptacles held in said predetermined pattern or design, said step of simultaneously picking up and holding said objects comprising: causing a quantity of said objects to be positioned on the top surface of a loading plate having cavities therein arranged in said predetermined pattern or design, vibrating said objects into said cavities and hence into said predetermined pattern or design in substantially the same position in which they are to be deposited in said plurality of receptacles, thereafter simultaneously applying a vacuum to said plurality of objects to thereby simultaneously pick up and hold said plurality of objects in said predetermined pattern or design and in substantially the same position they are to be deposited in said receptacle.

14. The process of claim 13 wherein said quantity of said objects are positioned on said loading plate by inserting said plate with its top surface facing upwardly into a pile of said objects, said plate being vibrated and thereby loaded while inserted in said pile of objects with its top surface facing upwardly by shaking the same.

15. The process of claim 13 wherein said step of depositing said objects in said plurality of receptacles comprises, moving said plurality of objects held by said vacuum toward said plurality of receptacles held in said predetermined pattern or design and in alignment with said plurality of objects until said plurality of objects are deposited in said plurality of receptacles, and, thereafter, releasing the vacuum on said objects.

16. The process of claim 15 wherein said objects are simultaneously crimped in said receptacles after they have been deposited therein.

17. A process for simultaneously picking up and holding a plurality of objects in a predetermined pattern or design comprising positioning a quantity of said objects on the top surface of a loading plate having a plurality of cavities therein arranged in said predetermined pattern or design, vibrating said objects into said cavities and hence into said predetermined pattern or design in predetermined spatial positions, simultaneously applying a vacuum to said plurality of objects to simultaneously pick up and hold them in said predetermined design.

18. An apparatus for depositing ornamental objects in receptacles comprising means for simultaneously picking up and holding a plurality of said objects in a predetermined pattern or design and each of said objects in a predetermined position without handling each individual object separately and means for thereafter simultaneously depositing said objects in predetermined spatial positions in a plurality of receptacles held in said predetermined pattern or design without handling each individual object separately and crimping said objects in said receptacle.

19. An apparatus for simultaneously picking up and holding a plurality of ornamental objects in a predetermined pattern or design comprising a tool adapted to be held in the ram of a press, said tool comprising a gas chamber, a plurality of gas passages arranged in said predetermined pattern or design, passing through one wall of said chamber and connecting said chamber with the atmosphere, means for providing a vacuum in said chamber and through said passages to the ends thereof opposite from the ends leading into said chamber, means for attaching said tool to said press.

20. An apparatus for depositing ornamental objects in receptacles comprising means for simultaneously picking up and holding a plurality of said objects in a predetermined pattern or design and each of said objects in a predetermined spatial position without handling each individual object separately and means for thereafter simultaneously depositing said objects in predetermined spatial positions in a plurality of receptacles held in said predetermined pattern or design without handling each individual object separately, said means for simultaneously picking up and holding said objects comprising means for applying a vacuum thereto to thereby pick them up and hold them.

21. A process for setting a plurality of small ornamental stones in a plurality of receptacles arranged in a predetermined pattern without manually handling each stone separately, comprising aligning said plurality of stones in said predetermined pattern and each of them in a predetermined spatial position without manually handling each stone separately, simultaneously depositing said stones in predetermined spatial positions in said plurality of receptacles without manually handling each of said stones separately.

22. Apparatus for setting a plurality of small ornamental stones in a plurality of receptacles arranged in a predetermined pattern without manually handling each stone separately, comprising means for aligning said plurality of stones in said predetermined pattern and in predetermined spatial positions without manually handling each stone separately, means for depositing said plurality of stones in predetermined spatial positions in said plurality of receptacles arranged in said predetermined pattern without manually handling each stone separately.

References Cited in the file of this patent

UNITED STATES PATENTS

| 134,962 | Whittemore | Jan. 14, 1873 |
|---|---|---|
| 1,135,576 | Grabau | Apr. 13, 1915 |
| 1,649,540 | Moscini | Nov. 15, 1927 |
| 1,824,399 | Graffious | Sept. 22, 1931 |
| 2,045,767 | Funk | June 30, 1936 |
| 2,339,115 | Scherer | Jan. 11, 1944 |
| 2,398,922 | Coons | Apr. 23, 1946 |
| 2,432,319 | Le Van | Dec. 9, 1947 |
| 2,583,615 | Tobey | Jan. 29, 1952 |